United States Patent [19]

Shirai et al.

[11] Patent Number: 4,876,853
[45] Date of Patent: Oct. 31, 1989

[54] TANDEM MASTER CYLINDER WITH BOOSTER PISTON AT PEDAL-REMOTE END OF MASTER CYLINDER AND WITH BOOSTER-PRESSURE RESPONSIVE RESERVOIR VALVE FOR FORWARD BRAKE CIRCUIT

[75] Inventors: Kenji Shirai, Mishima; Yoshihisa Nomura, Toyota, both of Japan

[73] Assignee: Toyota Jidosha Kabushiki Kaisha, Toyota, Japan

[21] Appl. No.: 11,240

[22] Filed: Feb. 5, 1987

[30] Foreign Application Priority Data

Feb. 5, 1986 [JP] Japan ................................. 61-23376

[51] Int. Cl.$^4$ .................... B60T 11/24; B60T 11/28; B60T 13/12; B60T 13/14
[52] U.S. Cl. .................................. 60/547.1; 60/561; 60/562; 60/588; 60/593
[58] Field of Search ................ 60/562, 561, 547.1, 60/547.3, 552, 553, 556, 582, 593, 588

[56] References Cited

U.S. PATENT DOCUMENTS

| | | | |
|---|---|---|---|
| 3,815,364 | 6/1974 | Belart et al. | 60/552 |
| 3,827,242 | 8/1974 | Belart | 60/552 |
| 4,086,770 | 5/1978 | Shaw | 60/562 |
| 4,225,022 | 9/1980 | Belart | 60/562 |
| 4,294,070 | 10/1981 | Farr | 60/562 |
| 4,472,940 | 9/1984 | Kubota | 60/562 |
| 4,483,144 | 11/1984 | Steffes | 60/562 |
| 4,586,591 | 5/1986 | Belart | 60/547.1 |
| 4,678,243 | 7/1987 | Leiber | 303/114 X |

FOREIGN PATENT DOCUMENTS

| | | |
|---|---|---|
| 3124755 | 1/1983 | Fed. Rep. of Germany . |
| 3215954 | 11/1983 | Fed. Rep. of Germany ..... 60/547.1 |
| 57939 | 1/1982 | Japan . |
| 2171769 | 9/1986 | United Kingdom . |

*Primary Examiner*—Robert E. Garrett
*Assistant Examiner*—George Kapsalas
*Attorney, Agent, or Firm*—Oblon, Spivak, McClelland, Maier & Neustadt

[57] ABSTRACT

A tandem master cylinder with a booster used for a hydraulic actuator such as an automotive brake system. The master cylinder has a first and a second independently movable presser piston disposed in tandem in a first housing such that the presser pistons and the first housing define a first and a second pressure chamber. The booster has a first power piston advanced by a fluid pressure in a first power chamber formed in a second housing, to advance the first presser piston. The booster has a valve operable due to a relative movement between the first power piston, and an operating member for operating said booster, whereby the fluid pressure in the first power chamber is controlled according to an operating force applied to the operating member. In a third housing, there is disposed a second power piston, which has opposite pressure-receiving faces one of which receives a fluid pressure in the second pressure chamber, the other face receiving a fluid pressure in a second power chamber, whereby the fluid pressure in the second pressure chamber is controlled according to the fluid pressure in the second power chamber. The second power chamber is connected to the first power chamber.

12 Claims, 2 Drawing Sheets

TANDEM MASTER CYLINDER WITH BOOSTER PISTON AT PEDAL-REMOTE END OF MASTER CYLINDER AND WITH BOOSTER-PRESSURE RESPONSIVE RESERVOIR VALVE FOR FORWARD BRAKE CIRCUIT

BACKGROUND OF THE INVENTION

1. Field of the Invention

The present invention relates in general to a master cylinder used as a hydraulic pressure source for a hydraulically operated braking device or other hydraulic actuators. More particularly, the invention is concerned with improvements in a combination of a tandem master cylinder wherein two presser pistons are disposed in tandem, and a hydraulically operated booster.

2. Description of the Prior Art

A tandem master cylinder equipped with a booster is widely used, for example, as a hydraulic pressure source for a hydraulically operated braking device for an automotive vehicle, wherein two mutually independent brake systems are provided. In this case, an operating force applied to a brake pedal or other operating member is boosted by the booster, and the thus boosted operating force acts on two presser pistons of the master cylinder, so that fluid pressures are produced in two mutually independent pressure chambers formed in front of the respective presser pistons. These fluid pressures are applied through mutually independent piping systems to brake cylinders provided for the wheels of a vehicle for restraining the rotation of the wheels.

In the master cylinder of the type indicated above, a large amount of brake fluid of a high pressure level may be supplied to the brake cylinders or other actuators, with a short operating stroke of the operating member and with a small operating force exerted to the operating member, if the presser pistons have a large pressure generating face, and the booster has a high boosting rate.

In the above case, however, there is an inconvenience when there arises a problem which causes a failure of supply of a pressurized fluid to the booster. Namely, if the booster fails to operate, the operating force applied to the operating member must be mechanically transmitted to the presser pistons of the master cylinder, so that the master cylinder may generate pressures in the pressure chambers. In the case where the presser pistons have a relatively large pressure generating face, an accordingly large force must be applied to the operating member, for the master cylinder to produce sufficiently high pressures. In this sense, there is an upper limit in the surface area of the pressure generating faces of the presser pistons of the master cylinder.

In view of the above inconvenience, there is proposed a brake system wherein a power chamber of a booster is connected, via changeover valves, to passages which connect the pressure chambers of a master cylinder to brake cylinders at the wheels of a vehicle, as disclosed in laid-open publication No. 57-939 of Japanese Patent Application (corresponding to German Patent Application No. P3016683.7). Normally, the changeover valves hold the brake cylinders in communication with the pressure chambers, but hold the brake cylinders disconnected to the power chamber of the booster. When a pressurized fluid is delivered from the power chamber while no pressure is generated in the pressure chambers of the master cylinder, the changeover valves are operated to allow the pressurized fluid from the power chamber to be supplied to the brake cylinders. This arrangement is based on a fact that until a brake clearance in each brake cylinder is eliminated, a relatively low pressure of the brake fluid is sufficient to operate each brake cylinder. If the load of return springs for the presser pistons of the master cylinder is set so that the presser pistons will not operate at such low pressure level, the brake cylinder may be operated with the brake fluid of a relatively low pressure which is produced in the power chamber of the booster as a result of an initial short operating stroke of a brake pedal, and which is delivered to the brake cylinders through the changeover valves. After the pressure in the power chamber exceeds an upper limit, the presser pistons of the master cylinder are activated to supply the brake cylinders with the brake fluid of a higher level which corresponds to the operating force applied to the brake pedal. In other words, a portion of a volume of the brake fluid necessary to activate the brake cylinders is delivered from the power chamber of the booster. In this arrangement, the required operating stroke of the brake pedal is reduced by an amount corresponding to the portion of the fluid received from the power chamber of the booster.

In the hydraulic brake device equipped with the changeover valves discussed above, the operating stroke of the brake pedal may be small only where the brake pedal is operated slowly enough to permit the presser pistons of the master cylinder to be activated after the brake clearance in each brake cylinder has been eliminated with the brake fluid delivered from the power chamber of the booster. However, if the brake pedal is operated abruptly and the presser pistons of the master cylinder are activated to deliver a pressurized fluid to the brake cylinders before the brake clearance in each brake cylinder has been completely eliminated, a portion of the fluid necessary for the elimination of the brake clearance is supplied from the master cylinder. This results in a corresponding increase in the required operating stroke of the brake pedal.

SUMMARY OF THE INVENTION

The present invention was developed in light of the above situations in the prior art. It is therefore an object of the present invention to provide a combination including a tandem master cylinder and a booster, which requires a relatively small operating stroke of an operating member such as a brake pedal, even when the operating member is operated abruptly.

According to the present invention, there is provided a combination including (a) a tandem master cylinder having a first and a second presser piston which are disposed in tandem in a first housing such that the first and second presser pistons are movable independently of each other, and cooperate with the first housing to define a first and a second pressure chamber formed in front of the first and second presser pistons, respectively, and (b) a booster having a first power piston which is advanced by a fluid pressure in a first power chamber formed in a second housing, so as to advance the first presser piston, the booster further having a booster valve which is operated due to a relative movement between the first power piston, and an operating member for operating the booster, the booster valve being operable to control the fluid pressure in the first power chamber according to an operating force applied to the operating member, characterized in that a second power piston is disposed in a third housing, the second power piston having opposite pressure-receiving faces one of which is adapted to receive a fluid pressure in the second pressure chamber, and the other of which receives a fluid pressure in a second power chamber. The second power piston is operable to control the fluid pressure in the second pressure chamber according to the fluid pressure in the second power chamber. The second power chamber is connected to the first power chamber.

The second power piston may be disposed in the third housing which has an axis offset from that of the first housing, or in the third housing which is integral with the first housing. In the former case, the pressure-receiving face of the second power piston remote from the second power chamber cooperates with the third housing to define a pressure chamber which communicates with the second pressure chamber through a fluid passage. In the latter case, the second power piston and the second presser piston are disposed such that these pistons face each other, with the second pressure chamber defined therebetween.

In the combination of the present invention constructed as described above, the first power piston of the booster advances the first presser piston of the master cylinder as the operating member is operated. As a result, a pressurized fluid generated in the first pressure chamber is delivered to a first piping system. In the meantime, the second power piston is operated by a fluid pressure of substantially the same level as the pressure in the first power chamber of the booster. As a result, a pressurized fluid produced by the second power piston is delivered to a second piping system connected to the second pressure chamber of the master cylinder. In this case, the second presser piston is not required to be advanced, but merely functions as a partition wall which separates the first and second pressure chambers from each other.

In the event that the pressure in the first pressure chamber cannot be raised due to damage or a defect in the first piping system, for example, the operating member is operated until the first presser piston is advanced to its fully advanced position. Subsequently, the second power piston is operated with the operating member held standstill, whereby a pressurized fluid is delivered from the second pressure chamber of the master cylinder to the second piping system.

In the event that the pressure in the second pressure chamber cannot be raised, the operation of the instant combination differs depending upon the arrangement of the second power piston relative to the second presser piston. In one preferred form of the invention wherein the second power piston is disposed in facing relation with the second presser piston, with the second pressure chamber formed therebetween, the second power piston moves toward the second presser piston, while displacing the fluid from the second pressure chamber, until the second power piston finally abuts on the second presser piston. Thus, the second power piston prevents the second presser piston from being advanced, and the first power piston cooperates with the second presser piston at rest to discharge the fluid from the first pressure chamber into the first piping system. Therefore, the operating stroke of the operating member in this event of pressure failure is the same as that required when the first and second piping systems are normal.

In the case where the second power piston is disposed in the third housing which is not coaxial with the first housing of the master cylinder, the second power piston does not function to prevent the second presser piston from being advanced. Consequently, the second presser piston is advanced to its fully advanced position. Thereafter, the first presser piston cooperates with the second presser piston at the fully advanced position, to discharge the fluid from the first pressure chamber into the first piping system. As a result, the operating stroke of the operating member is increased by an amount corresponding to a stroke necessary to move the second presser piston to its fully advanced position, as compared with the operating stroke required when the first and second piping systems are normal.

In the event that the pressures in the first and second power chambers cannot be raised, due to a problem with a pressure source provided to supply the booster with a pressurized fluid, the first and second power pistons cannot be hydraulically operated. In this case, the first presser piston of the master cylinder is mechanically advanced directly by the operating member, and the second presser piston is advanced by the pressure developed in the first pressure chamber as a result of the advancement of the first presser piston, whereby a pressure is generated in the second pressure chamber. Thus, when the booster fails to operate, the instant tandem master cylinder equipped with the booster is operated as if the master cylinder were not equipped with a booster.

It will be understood from the foregoing explanation that as long as the components connected to the instant master cylinder-booster combination of the present invention are all intact, the second power piston is activated almost in synchronization with the activation of the first power piston based on the operation of the operating member, causing the fluid in the second pressure chamber to be delivered into the second piping system, even when the operating member is operated abruptly, in the same manner as when the operating member is operated slowly. That is, the operating stroke of the operating member does not change depending upon the speed at which the operating member is manipulated. Further, since the second presser piston is not required to be moved, the operating member is required to be operated by only an amount which corresponds to an operating stroke of the first presser piston. The required operating stroke of the operating member for the instant combination of a tandem master cylinder and a booster is almost reduced to a half of that for a tandem master cylinder-booster combination which is not equipped with a second power piston.

Even if the first piping system connected to the first pressure chamber is damaged, the second presser piston is not operated, requiring the operating member to be operated only by an amount which corresponds to an operating stroke of the first presser piston. In the case where the second piping system becomes defective, on the other hand, the required operating stroke of the operating member may be either a value corresponding to a sum of the operating stroke of the first presser piston and the operating stroke of the second presser piston to its fully advanced position, or equal to that required when both piping systems are intact, depending upon the arrangement of the second power piston.

In the tandem master cylinder-booster arrangement disclosed in the laid-open publication previously identified, in the event of a failure in either one of the two systems, the required operating stroke of the operating member amounts to a value which corresponds to a sum of the operating stroke of the presser piston for the defective system, and the operating stroke of the presser piston for the intact system. In the arrangement of the present invention, however, the required operating stroke is substantially a half of that in the above known arrangement, except in a specific form of the invention wherein the second power piston is unable to prevent the second presser piston from being advanced in the event of a pressure failure in the second piping system. In this specific case, the required operating stroke is the same as required in the above known arrangement.

BRIEF DESCRIPTION OF THE DRAWINGS

The above and optional objects, features and advantages of the present invention will be better understood by reading the following detailed description of preferred embodiments of the present invention, when considered in connection with the accompanying drawings, in which.

DESCRIPTION OF THE PREFERRED EMBODIMENTS

The present invention will be described in detail, by reference to the accompanying drawings, which show hydraulically operated braking devices for an automotive vehicle, having two mutually independent brake systems connected to a master cylinder.

Figure 1:
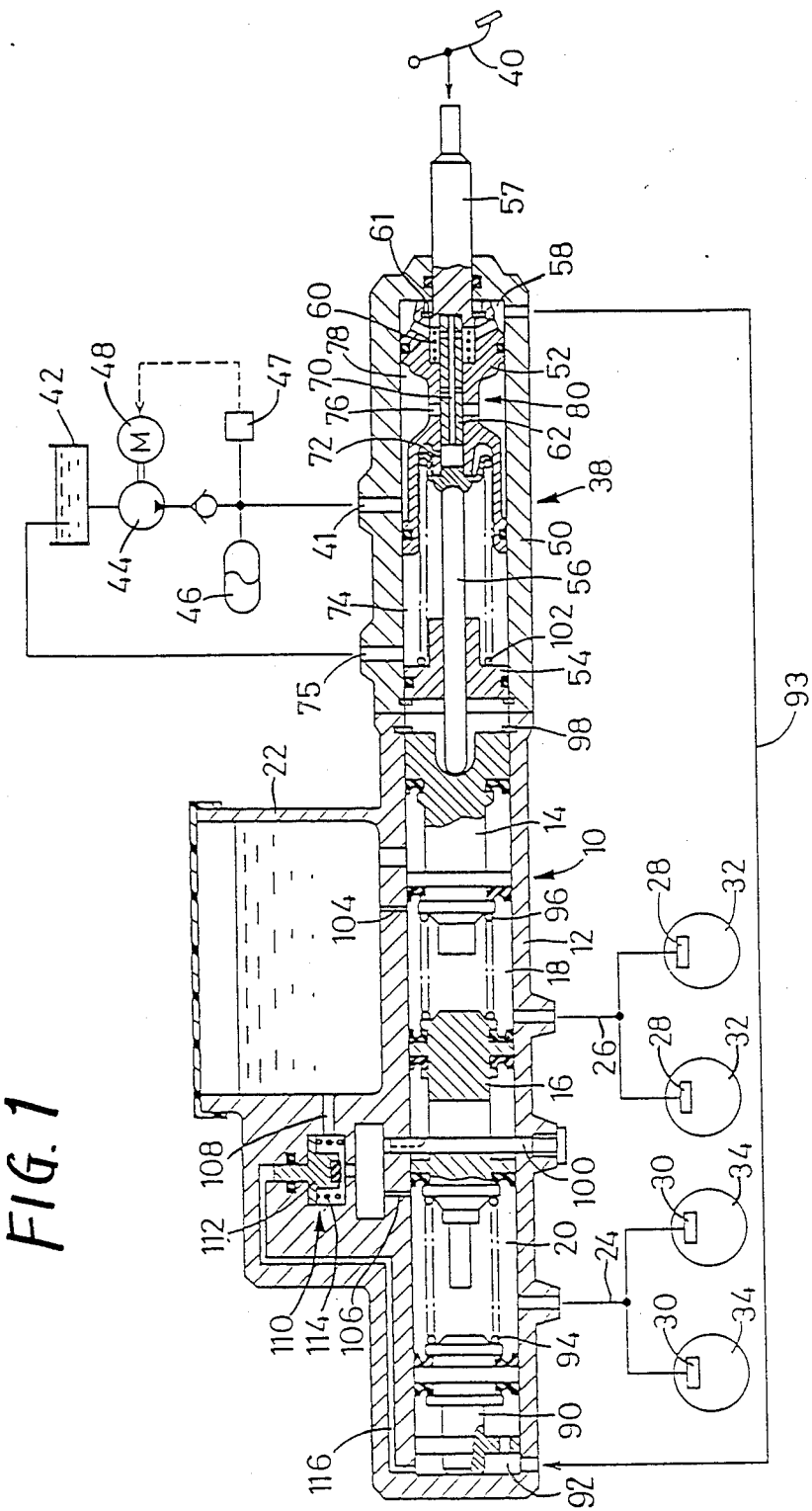
FIG. 1 is an elevational view in cross section of one embodiment of a combination of the present invention including a tandem master cylinder and a booster, and a diagrammatic view schematically illustrating a hydraulically operated braking device incorporating the combination, wherein two mutually independent brake systems are provided.

Referring first to FIG. 1, reference numeral 10 designates a tandem master cylinder including a first presser piston 14 and a second presser piston 16, which are slidably received in tandem in a first housing 12. The first and second presser pistons 14, 16 and the first housing 12 cooperate to define a first and a second pressure chamber 18, 20 located in front of the first and second presser pistons 14, 16, respectively. The first and second pressure chambers 18, 20 are connected to a reservoir 22 for storing a brake fluid under the atmospheric pressure. The first and second pressure chambers 18, 20 are further connected to a pair of rear-wheel brake cylinders 28 and a pair of front-wheel brake cylinders 30, through fluid passages 26, 24, respectively. The brake cylinder 28 are provided for restraining rotation of rear wheels 32 of the vehicle, while the brake cylinders 30 are provided for restraining rotation of front wheels 34 of the vehicle.

The master cylinder 10 is operatively connected to an operating member in the form of a brake pedal 40, via a hydraulic booster 38. The booster 38 has a port 41 which receives a pressurized working fluid stored in an accumulator 46. The accumulator 46 is connected to a pump 44, which pressurizes the working fluid in a reservoir 42, and feeds the accumulator 46 with the pressurized fluid. A pump motor 48 to drive the pump 44 is controlled in response to a pressure switch 47 which senses the pressure of the fluid stored in the accumulator 46, so that the pressure in the accumulator 46 is maintained within a predetermined range.

The hydraulic booster 38 is accommodated in a second housing 50 which is integral with the first housing 12 of the master cylinder 10. The second housing 50 houses a first power piston 52 in a fluid-tight manner such that the power piston 52 is slidably movable. A cylindrical auxiliary member 54 is fixed to one end of the second housing 50 which terminates in the first housing 12 of the master cylinder 10. The auxiliary member 54 functions as part of the second housing 50. An output rod 56 of the booster 38 slidably extends through the auxiliary member 54, so that the rod 56 may abut at its opposite axial ends on the first presser piston 14 and the first power piston 52, respectively.

An input piston 57 fluid-tightly and slidably extends through the other end of the second housing 50 remote from the master cylinder. This input piston 57 cooperates with the first power piston 52 and the second housing 50 to define a first power chamber 58. Between one axial end of the input piston 57 and the first power piston 52, there is disposed a spring 60 which biases the two pistons 57, 52 in opposite directions, causing the two pistons to move away from each other. The relative positions of the two pistons 57, 52 biased by the spring 60 are limited by a snap ring 61. To the end of the input piston 57 on the side of the spring 60, there is secured a valve spool 62 in a coaxial relation with the input piston 57. This valve spool 62 is slidably and substantially fluid-tightly received in an axial bore formed along its centerline of the first power piston 52. Normally, the valve spool 62 is placed in a position of FIG. 1, wherein the first power chamber 58 is held in communication with the reservoir 42, through a passage 70 formed in the valve spool 62, a port 72 formed in the piston 52, a low-pressure chamber 74, a port 75, etc. When the valve spool 62 is advanced by a predetermined distance relative to the first power piston 52 (in the left direction in FIG. 1), the passage 70 is disconnected from the port 72. When the valve spool 62 is moved a further distance, the passage 70 in the spool 62 is brought into communication with a passage 76 formed in the first power piston 52. The passage 76 communicates with an annular chamber 78 which in turn communicates with the port 41 leading to the accumulator 46. Namely, the valve spool 62 cooperates with the first power piston 52 to constitute a booster valve 80 which has three positions: a first position in which the first power chamber 58 communicates with the reservoir 42; a second position in which the first power chamber 58 communicates with a pressure source in the form of the accumulator 46; and a third position in which the first power chamber 58 is disconnected from both of the reservoir 42 and the accumulator 46.

A second power piston 90 is slidably and fluid-tightly received in an end portion of the first housing 12 of the master cylinder 10 remote from the booster 38. The second power piston 90 is disposed in facing relation with the second presser piston 16, with the second pressure chamber 20 defined therebetween. In this specific embodiment, the second power piston 90 is housed in a third housing which is integral with the first housing 12 of the master cylinder 10. The third housing, and one of opposite faces of the second power piston 90 remote from the second pressure chamber 20, cooperate with each other to define a second power chamber 92 which is connected to the first power chamber 58 of the booster 38, through a fluid passage 93.

A return spring 94 is interposed between the second power piston 90 and the second presser piston 16, while another return spring 96 is interposed between the second and first presser pistons 16, 14. The biasing load of the return spring 94 is selected to be larger than that of the return spring 96. Further, the retracted position of the first presser piston 14 is determined by a snap ring 98, while the retracted position of the return spring 94 is determined by a stop pin 100. In this arrangement, the second power piston 90, and the first and second pressure pistons 16, 14 are normally placed in their retracted positions indicated in FIG. 1. In the booster 38, a return spring 102 is interposed between the first power piston 52 and the auxiliary member 54, so that the first power piston 52 is normally held in its retracted position of FIG. 1.

For the fluid pressure in the first power chamber 58 of the booster 38 to be able to advance the first presser piston 14, the fluid pressure must be great enough to overcome biasing forces of the return springs 102, 96, plus sliding resistances of the first power piston 52 and the first presser piston 14. On the other hand, the fluid pressure in the second power chamber 92 may move the second power piston 90 toward the second presser piston 16, if the fluid pressure only overcomes a biasing force of the return spring 94, plus a sliding resistance of the second power piston 90. The sum of the biasing force and the sliding resistance in the latter case is smaller than the sum of the biasing forces and the sliding resistances in the former case. Therefore, the second power piston 90 may be activated by the fluid pressure which is slightly lower than that required to activate the first power piston 52. Consequently, the second power piston 90 commences to advance, before the second presser piston 16 commences to advance.

While the first and second presser pistons 14, 16 are placed in their retracted positions, compensating ports 104, 106 are open in the respective first and second pressure chambers 18, 20, at positions immediately in front of the respective pistons 14, 16, whereby the pressure chambers 18, 20 are held in communication with the reservoir 22 via the compensating ports 104, 106, respectively. The compensating port 106 is connected to the reservoir 22 through a compensating passage 108. A normally-open pilot-operated shut-off valve 112 is provided part way through the compensating passage 108. This shut-off valve 110 includes a valve member 112 which is biased by a spring 114, so that the valve member 112 is normally held away from its seat, thereby holding the compensating port 106 in communication with the reservoir 22 through the passage 108. The valve member 112 is adapted to receive a pilot pressure applied from the second power chamber 92 through a pilot-pressure passage 116 connected to the valve 110. When the fluid pressure in the second power chamber 92 is slightly elevated, the valve member 112 is seated on the seat, thereby closing the compensating passage 108.

In the hydraulically operated braking device constructed as described above, the booster valve 80 is in the position permitting the first power chamber 58 to be in communication with the reservoir 42, when the brake pedal 40 is in the non-operated position. In this condition, the first power chamber 58 is disconnected from the accumulator 46, and the accumulator 46 stores the highly pressurized working fluid, which has been pumped up from the reservoir 42 by the pump 44.

When the brake pedal 40 is operated in the above condition, the valve spool 62 is advanced relative to the first power piston 52, to initially close the port 72, that is, to disconnect the first power chamber 58 from the reservoir 42. With the valve spool 62 being further moved a predetermined additional distance relative to the power piston 52, the passage 70 is brought into communication with the port 76, whereby the first power chamber 58 is connected to the accumulator 46. As a result, the pressurized fluid as delivered from the accumulator 46 into the first power chamber 58, with a result of an increase in the first power chamber 58. Accordingly, the fluid pressure in the second power chamber 92 is raised. Since the second power piston 90 may be activated at a lower pressure than the first power piston 52, the second power piston 90 starts displacing the brake fluid in the second pressure chamber 20, into the fluid passage 24. In the meantime, the shut-off valve 110 is brought into its closed position before the power piston 90 starts advancing, the brake fluid in the second pressure chamber 20 will not be returned to the reservoir 22.

The first power piston 52 starts advancing a short time after the second power piston 52 has started to advance. The first power piston 52 advances the first presser piston 14 via the output rod 56, whereby the brake fluid in the first pressure chamber 18 is discharged into the fluid passage 26.

As a result of the above operation, the brake cylinders 28, 30 are activated, with brake pressures gradually increasing. As the brake pressures increase, the pressures in the pressure chambers 18, 20 are elevated. That is, an increasing reaction force is produced from the first presser piston 14, and is transmitted to the first power piston 52 via the output rod 56. Consequently, the fluid pressure in the first power chamber 58 is raised, causing an increase in the magnitude of a force which acts on the input piston 57 in a direction toward the brake pedal 40. Therefore, the vehicle driver can feel an increase in the reaction force of the brake pedal 40, and consequently an increase in the fluid pressures in the pressure chambers 18, 20 of the master cylinder 10.

When the vehicle driver ceases to depress the brake pedal 40, the valve spool 62 is stopped. However, the first power piston 52 continues to advance, until the port 76 is disconnected from the passage 70. Thus, the flow of the working fluid from the accumulator 46 to the first power chamber 58 is terminated, and the first power piston 52 is stopped. The second power piston 90 is also stopped at a position at which the fluid pressures in the second power and pressure chambers 92, 20 are substantially equal to each other.

While the braking device is operated as described above when the brake pedal 40 is operated relatively slowly, a movement of the brake pedal 40 is mechanically imparted to the first presser piston 14 via the output rod 56 when the brake pedal 40 is operated abruptly. In this case, it is possible that the first presser piston 40 is activated before the second power piston 90 is activated. In this instance, the second presser piston 16 may possibly be advanced toward the second power piston 90 by the fluid pressure in the first pressure chamber 18. Eventually, however, both of the first and second power pistons 52, 90 are activated so that substantially the same levels of fluid pressures are generated in the first and second pressure chambers 18, 20. Thus, the operating stroke of the brake pedal 40 necessary to provide a desired braking effect is not increased, even if the brake pedal 40 is operated at a relatively high speed.

The description then refers to operations of the braking device in the event of a failure to increase the pressure in the first or second pressure chamber 18 or 20, for example, due to damage to the front or rear piping system connecting the master cylinder 10 to the brake cylinders 28, 30.

If the pressure in the second pressure chamber 20 cannot be raised, the second power piston 90 is advanced until the piston 90 abuts on the second presser piston 16, thereby blocking an advancing movement of the second presser piston 16. Since the working fluid to advance the second power piston 90 is supplied to the second power chamber 92 from the accumulator 46 via the first power chamber 58 and passage 93, only a short movement of the brake pedal 40 necessary to switch the booster valve 38 is required. Thereafter, the first presser piston 14 is advanced by the movement of the first power piston 52. Thus, the first presser piston 14 cooperates with the second presser piston 16 at rest, to force the brake fluid in the first pressure chamber 18, out into the rear-wheel brake cylinders 28. Namely, even if a pressure failure takes place in the front-wheel brake system, the operating stroke of the brake pedal 40 is the same as required when the front-wheel and rear-wheel brake systems are both intact.

If a pressure failure occurs in the rear-wheel brake system (if, i.e., the pressure in the first pressure chamber 18 cannot be raised), a sufficiently high pressure is not produced in the first power chamber 58 until the first presser piston 14 is advanced to its fully advanced position at which the piston 14 abuts on the second pressure piston 16. That is, until the first presser piston 14 is fully advanced, a force to advance the second power piston 90 is not sufficient, and the pressure in the second pressure chamber 20 cannot be elevated to a sufficiently high level. Only after the brake pedal 40 has been operated a sufficient distance enough to advance the first pressure piston 14 to its fully advanced position is a sufficiently high pressure developed in the second pressure chamber 20. After the first presser piston 14 has abutted on the second presser piston 16, no additional operating stroke of the brake pedal 40 is required. The pressure in the second pressure chamber 20 can be controlled by adjusting the operating force of the brake pedal 40 so as to suitably operate the booster valve 80. Thus, if the rear-wheel brake system fails, the brake pedal 40 must be operated by an amount necessary to move the first presser piston 14 to its fully advanced position. That is, the required operating stroke of the brake pedal 40 in this case is greater than the stroke normally required when the two brake systems are intact. However, the above operating stroke required in the present braking device is considerably smaller than required on the conventional tandem master cylinder in which the brake pedal must be further operated by an additional amount corresponding to the operating stroke of the presser piston in the normal brake system.

There will be described next an operation in the event of a failure of the booster 38 due to a problem with the pressure source including the pump 44.

In this event, the pressures in the first and second power chambers 58, 92 cannot be elevated, and the power pistions 52, 90 cannot be moved. Hence, the operating force applied to the brake pedal 40 is mechanically transmitted to the first presser piston 14 via the input pistion 57, valve spool 62 and output rod 56. Thus, the instant tandem master cylinder with the booster 38 is operated in the same manner as a tandem master cylinder which is not equipped with a booster. As discussed above, the provision of the second power pistion 90 makes it possible to reduce the operating stroke of the brake pedal 40 to substantially half that of an ordinary tandem master cylinder, even if one of the two brake systems fails, as well as when the two systems are both normal, provided that the booster 38 can normally function. Since the pressure generating faces of the first and second presser pistions 14, 16 of the master cylinder 10 of the instant arrangement have the same surface area as those of the ordinary tandem master cylinder, the required operating stroke and force of the brake pedal 40 when the booster 38 fails to operate are the same as those required for operating the ordinary tandem master cylinder.

As is apparent from the foregoing description, before the first power and presser pistions 52, 14 commence to be activated, the second power pistion 90 commences to be activated for raising the pressure in the second pressure chamber 20, so as to activate the front-wheel brake cylinders 30. Thus, the operating force of the brake pedal 40 at which the brake cylinders 30 start providing a braking effect is reduced by an amount which corresponds to a difference between a sum of the biasing forces of the return springs 96, 102 and the sliding resistances of the pistons 52, 14, and a sum of the biasing force of the return spring 94 and the sliding resistance of the second power pistion 90.

In an ordinary tandem master cylinder, the presser pistons (14, 16) cannot start pressurizing the fluid until these pistions have moved past the corresponding compensating ports (104, 106). In the instant master cylinder-booster combination, however, the second power pistion 90 starts pressurizing the fluid to cause the front-wheel brake system to provide a braking effect, even while the presser pistons 14, 16 are both at their fully retracted positions. Thus, the operating stroke of the brake pedal 40 at which the braking device starts providing a braking effect is reduced, as compared with that in the conventional arrangement.

Further, it is noted that the working fluid for operating the booster 38 and the second power pistion 90 is different from the brake fluid. Therefore, even if a gas is introduced into the working fluid (liquid) for the booster 38, the gas will not be mixed with the brake fluid. In the case where the accumulator 46 is charged with a suitable gas, the gas may permeate through a sealing member of the accumulator, and meet the pressurized working liquid for the booster 38. Should such a gas be transferred to the brake cylinders 28, 30 with the brake fluid, the operating strokes of the presser pistons 14, 16 and the brake pedal 40 would be increased, because of an ineffective stroke due to compression of the gas. This kind of inconvenience is eliminated in the instant arrangement wherein the brake fluid is different from the fluid for the booster.

As described above, the illustrated braking system provides a sufficient braking effect with a relatively short operating stroke of the brake pedal 40. In other words, the brake pedal 40 has relatively high pedaling stiffness, as compared with a brake pedal used in connection with the conventional master cylinder arrangement. However, it is possible to adjust the required operating stroke or pedaling stiffness of the brake pedal 40 in steps or continuously, by providing a suitable device.

Figure 2:
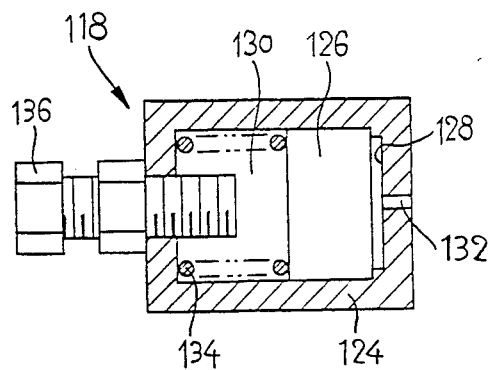
FIG. 2 is an elevational view in cross section of a fluid absorber device used in another embodiment of the invention.

For example, such a device may be provided in the form of a fluid absorber device as generally indicated at 118 in FIG. 2. The absorber device 118 has a housing 124 in which a piston 126 is slidably received. The housing 124 and the piston 126 cooperate to define a first chamber 128 on one side of the piston 126, and a second chamber 130 on the other side of the piston 126. The first chamber 128 has a port 132 which is connected to the master cylinder 10, so as to receive the brake fluid from the first pressure chamber 18. For example, the port 132 is connected to the passage 26. In the second pressure chamber 130, there is disposed a spring 134 to bias the piston 126 toward the first pressure chamber 128. When the brake pedal 40 is operated to apply brakes to the brake cylinders 28, 30, a portion of the brake fluid delivered from the first pressure chamber 18 is absorbed in the first chamber 128 of the fluid absorber device 118. The maximum volume of the first chamber 128 is determined by a stopper screw 136 which is screwed through the wall of the housing 124 such that the end of the screw 136 is located at a suitable position within the second chamber 130, so that the piston 126 is stopped by the screw 136. By changing the axial position of the screw 136 relative to the housing 124, the maximum volume of the first chamber 128 accommodating the fluid from the first pressure chamber 18 can be varied. Thus, the operating stroke of the brake pedal 40 at which the braking device starts providing a braking effect can be changed continuously by changing the position of the stop screw 136 of the fluid absorber device 118.

In the embodiment of FIG. 1 which has been described above, the second power piston 90 is disposed in facing relation with the first presser piston 16 of the master cylinder 10. In this arrangement, even if the pressure in the second pressure chamber 20 cannot be raised due to a damage or defect of the piping system, the second power piston 90 advances and abuts on the second presser piston 16, thereby preventing the presser piston 16 from advancing, and thus preventing an increase in the operating stroke of the brake pedal 40. However, the second power piston 90 may be disposed as schematically illustrated in FIG. 3, though this arrangement requires an additional operating stroke of the brake pedal 40 in the event of a failure in the front-wheel brake system.

Figure 3:
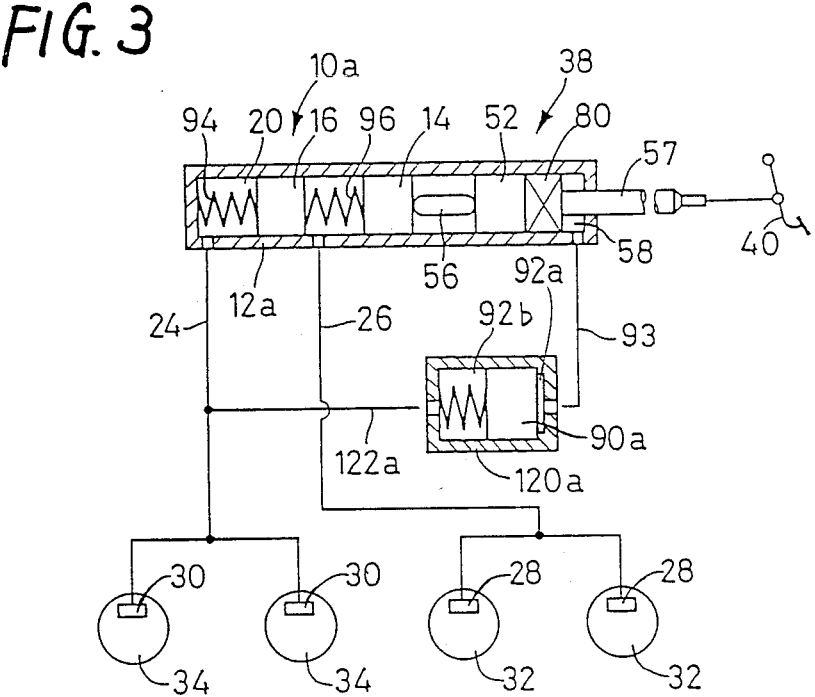
FIG. 3 is a view corresponding to that of FIG. 1, schematically showing a further embodiment of the invention.

Described more specifically, the modified embodiment of FIG. 3 uses a housing 120a which is separate from a housing 12a of a master cylinder 10a. A second power piston 90a is slidably received in the housing 120a. The housing 120a and the second power piston 90a cooperate to define a second power chamber 92a on one side of the piston 90a, and a chamber 92 on the other side of the piston 90a. The second power piston 92a is connected to the first power chamber 58, while the chamber 92b is connected to the second pressure chamber 20 through the passage 24, and a passage 122a connected to the chamber 92b.

In the instant modified embodiment, the front-wheel brake cylinders 30 are supplied with the pressurized brake fluid by the second power piston 90a, as long as the booster 38 normally functions. The passage 122a may be connected directly to the second pressure chamber 20, so that the brake fluid in the second pressure chamber 20 is displaced by the brake fluid delivered from the chamber 92b upon operation of the second power piston 90a. The other portion of the instant embodiment is identical with the corresponding portion of the preceding embodiment of FIG. 1. The same reference numerals as used in FIG. 1 are used in FIG. 3 to identify the corresponding elements, and no redundant detailed description of these elements will be provided.

In the illustrated embodiments wherein the circuit for operating booster 38 is separate from the circuit for operating the brake cylinders, a working fluid for the booster 38 may be a liquid different from the brake fluid, or may be a gaseous fluid.

It is to be understood that the present invention may be embodied with various other changes, modifications and improvements, which may occur to those skilled in the art.

What is claimed is:

1. A combination including a tandem master cylinder and a booster, said master cylinder having a first housing, a first and a second presser piston which are disposed in tandem in the first housing such that the first and second presser pistons are movable independently of each other and cooperate with the first housing to define a first and a second pressure chamber which are formed in front of said first and second presser pistons, respectively, said booster having a second housing, a first power piston cooperating with the second housing to define a first power chamber, said first power piston being advanced by a fluid pressure in said first power chamber, so as to advance said first presser piston, said booster further having a booster valve which is operated due to relative movement between said first power piston, and an operating member for operating said booster, said booster valve being operable to control the fluid pressure in said first power chamber according to an operating force applied to said operating member, wherein the improvement comprises:

a third housing, a second power piston disposed in said third housing and cooperating with the third housing to define a second power chamber, said second power piston having opposite pressure-receiving faces one of which receives a fluid pressure in said second pressure chamber, the other pressure-receiving face receiving a fluid pressure in said second power chamber, said second power piston being operable to control the fluid pressure in said second pressure chamber according to the fluid pressure in said second power chamber;

a fluid passage for connecting said second power chamber and said first power chamber;

a reservoir for storing a working a working fluid under an atmospheric pressure;

a compensating passage formed so as to effect communication between said second pressure chamber and said reservoir, at least when said second pressure piston is in a retracted position thereof; and shut-off means operable so as to normally hold said compensating passage open, and shut-off said compensating passage when the fluid pressure in said second power chamber exceeds a predetermined limit.

2. A combination according to claim 1, wherein said compensating passage has a compensating port which is open to said second pressure chamber at a position immediately in front of said retracted position of said second presser piston, said shut-off means comprising a pilot-operated shut-off valve, and a passage connecting said shut-off valve and said second power chamber, said shut-off valve being normally placed in an open position thereof, and brought to a closed position thereof when the fluid pressure in said second power chamber exceeds said predetermined limit.

3. A combination including a tandem master cylinder and a booster, said master cylinder having a first housing, a first and a second presser piston which are disposed in tandem in the first housing such that the first and second presser pistons are movable independently of each other and cooperate with the first housing to define a first and a second pressure chamber which are formed in front of said first and second presser pistons, respectively, said booster having a second housing, a first power piston cooperating with the second housing to define a first power chamber, said first power piston being advanced by a fluid pressure in said first power chamber, so as to advance said first presser piston, said booster further having a booster valve which is operated due to relative movement between said first power piston, and an operating member for operating said booster, said booster valve being operable to control the fluid pressure in said first power chamber according to an operating force applied to said operating member, wherein the improvement comprises:
   a third housing,
   a second power piston disposed in said third housing and cooperating with the third housing to define a second power chamber, said second power piston having opposite pressure-receiving faces one of which receives a fluid pressure in said second pressure chamber, the other pressure-receiving face receiving a fluid pressure in said second power chamber, said second power piston being operable to control the fluid pressure in said second pressure chamber according to the fluid pressure in said second power chamber;
   a fluid passage for connecting said second power chamber and said first power chamber; and
   passage means for normally communicating said second pressure chamber with a reservoir and for shutting off communication when the fluid pressure in said second power chamber exceeds a predetermined limit.

4. A combination according to claim 3, wherein said first housing and said third housing consist of an integral housing, said second power piston and said second presser piston being disposed in facing relation with each other, with said second pressure chamber defined therebetween.

5. A combination according to claim 3, wherein said third housing has an axis offset from that of said first housing, said third housing and said one of opposite pressure-receiving faces of said second power piston defining a pressure chamber which communicates with said second pressure chamber through a fluid passage.

6. A combination according to claim 3, wherein a working fluid for operating said booster is a liquid.

7. A combination according to claim 3, wherein a working fluid for operating said booster is a gas.

8. A combination according to claim 1, wherein said first and second presser pistons, and said first and second power pistons, are all disposed coaxially with each other.

9. A combination according to claim 1, wherein said operating member is operable for mechanically advancing said first presser piston.

10. A hydraulically operated braking device for an automotive vehicle having front and rear wheels, comprising a combination as defined in claim 3, a first brake system, and a second brake system independent of said first brake system, said first brake system including rear-wheel brake cylinders connected to said first pressure chamber for applying brake to the rear wheels of the vehicle, said second brake system including front-wheel brake cylinders connected to said second pressure chamber for applying brake to the front wheels of the vehicle.

11. A hydraulically operated braking device for an automotive vehicle having a plurality of wheels, comprising a combination as set forth in claim 3, at least one first brake cylinder provided for at least one of said wheels, at least one second brake cylinder provided for at least one of the other wheels, a first passage connecting said first pressure chamber to said at least one first brake cylinder, a second passage connecting said second pressure chamber to said at least one second brake cylinder, and a fluid absorber device connected to said first passage for accommodating an adjustable volume of a portion of a brake fluid delivered from said first pressure chamber.

12. A hydraulically operated braking device for an automotive vehicle, having a combination of a tandem master cylinder and a booster as set forth in claim 3, a first piping system for supplying a working fluid to said booster and the second power chamber, and a second piping system for supplying a brake fluid from said master cylinder to brake cylinders provided for wheels of the vehicle, said first and second piping systems being completely independent of each other, whereby said working fluid and said brake fluid are not mixed with each other.

* * * * *